May 7, 1935.  T. M. RECTOR  2,000,645
APPARATUS FOR PREPARING FOOD PRODUCTS
Filed Oct. 30, 1930   9 Sheets-Sheet 1

Inventor
Thomas M. Rector
By
Cameron, Kerkam & Sutton
Attorneys

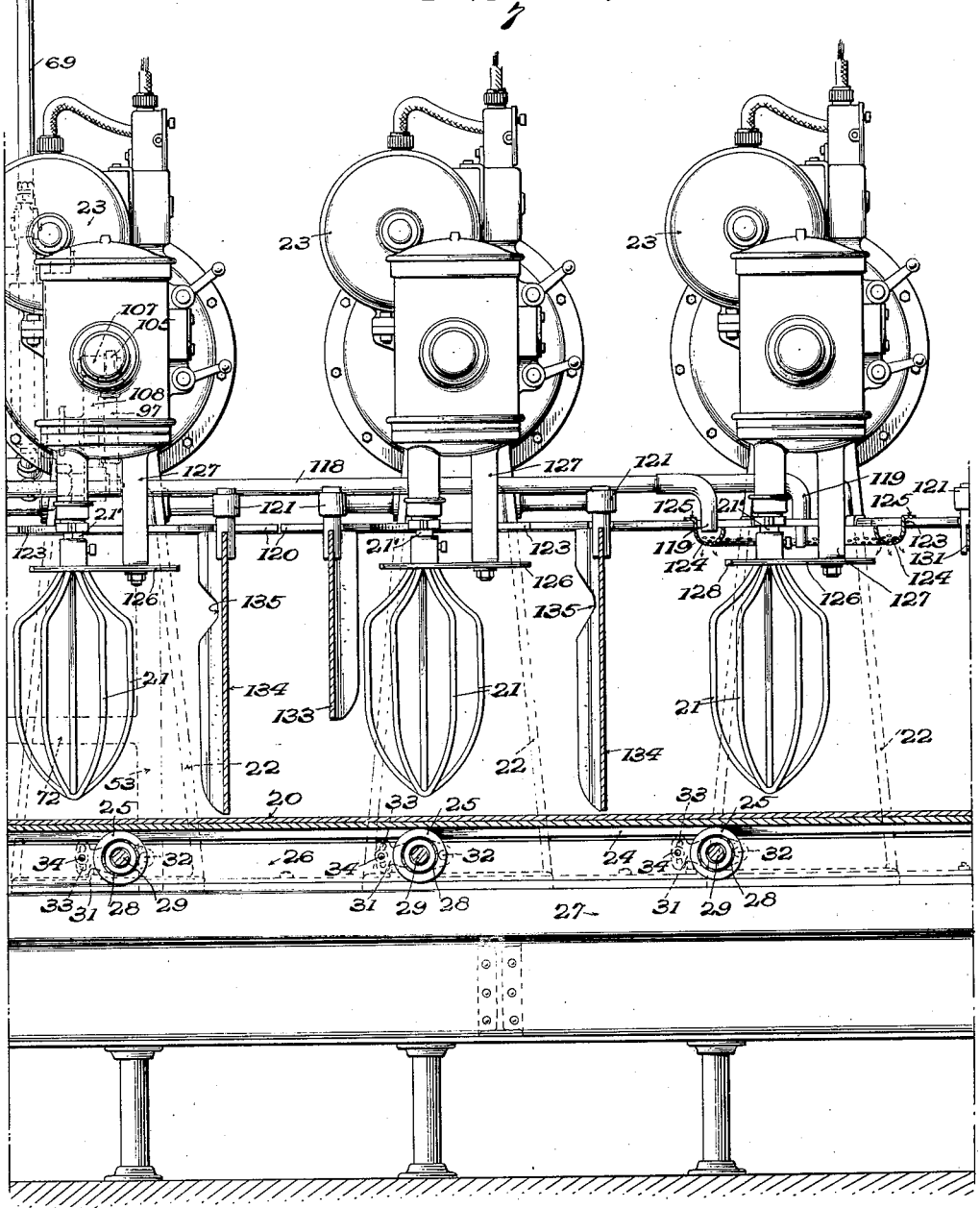

May 7, 1935.  T. M. RECTOR  2,000,645
APPARATUS FOR PREPARING FOOD PRODUCTS
Filed Oct. 30, 1930  9 Sheets-Sheet 3
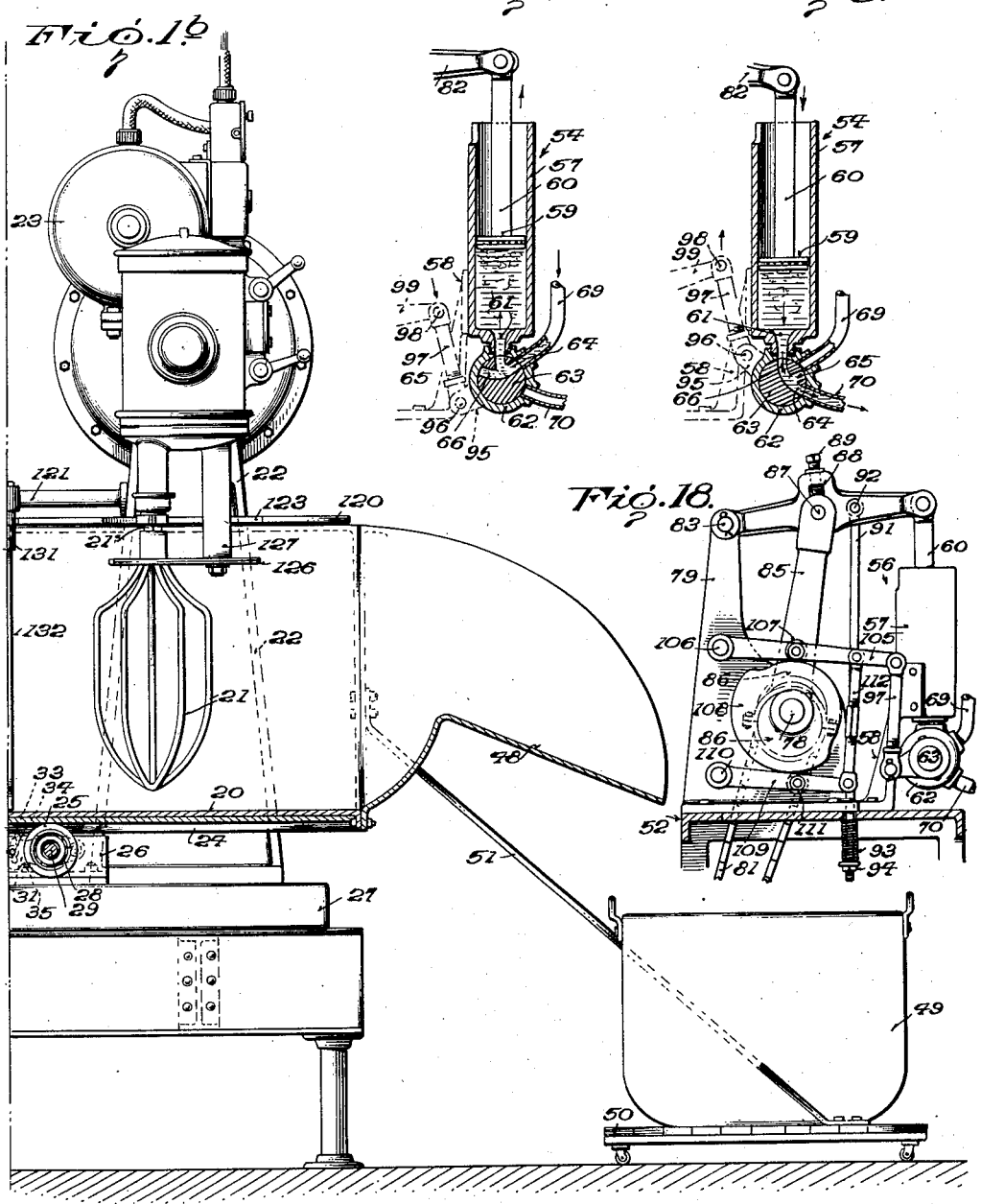

May 7, 1935. T. M. RECTOR 2,000,645
APPARATUS FOR PREPARING FOOD PRODUCTS
Filed Oct. 30, 1930 9 Sheets-Sheet 4
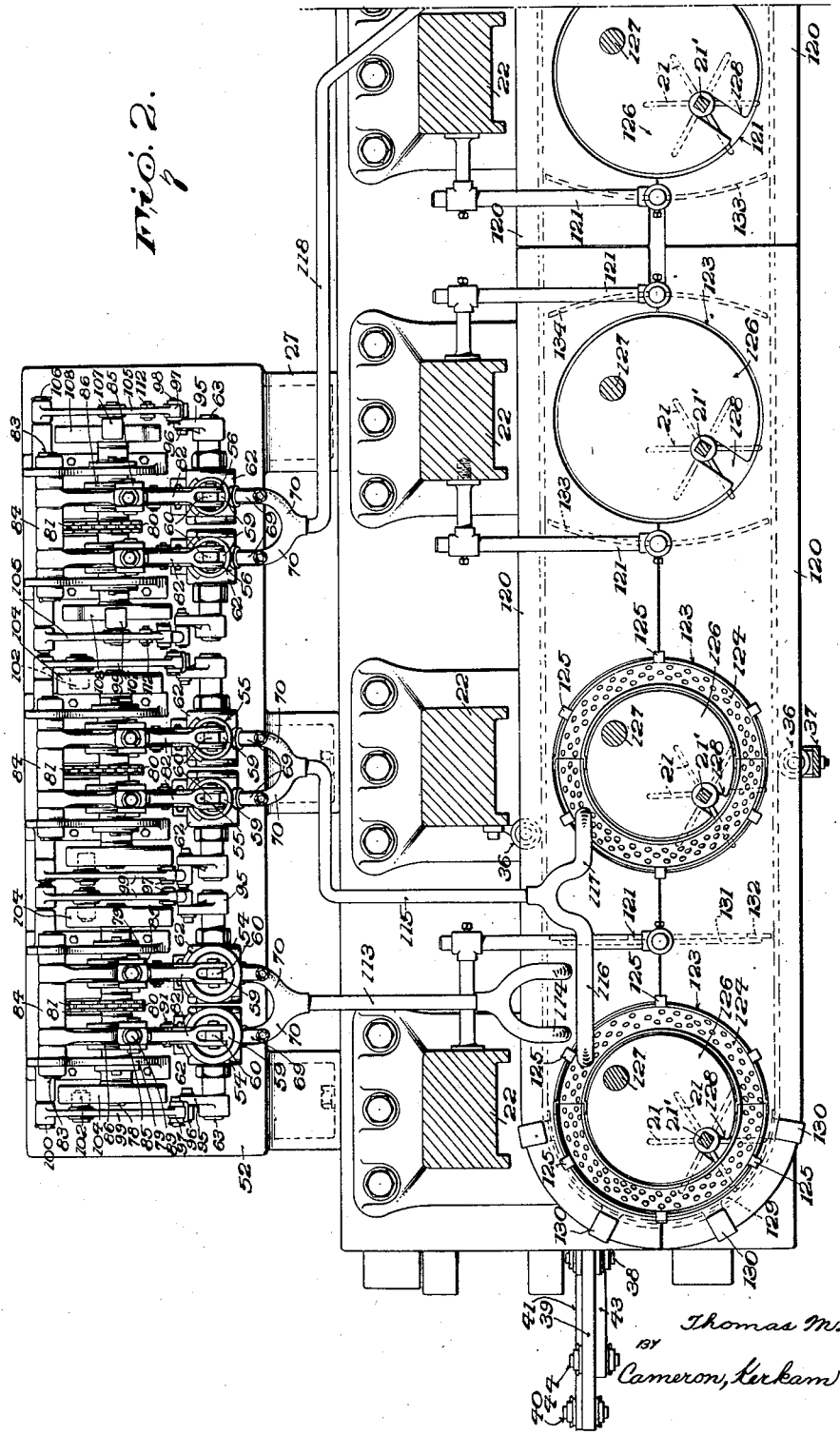
Inventor
Thomas M. Rector,
By
Cameron, Kerkam & Sutton.
Attorneys May 7, 1935.  T. M. RECTOR  2,000,645
APPARATUS FOR PREPARING FOOD PRODUCTS
Filed Oct. 30, 1930  9 Sheets-Sheet 5
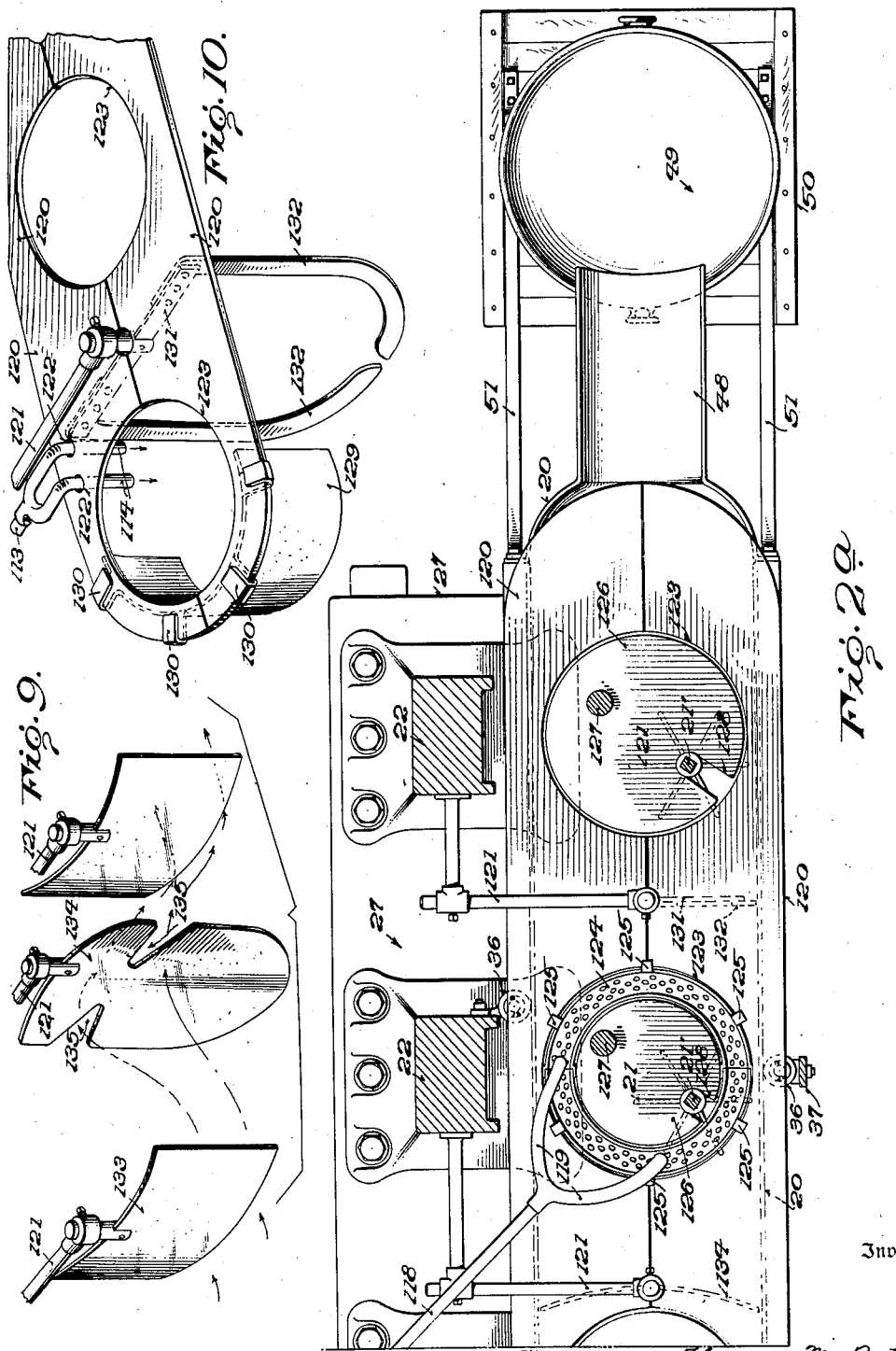
Inventor
Thomas M. Rector.
By Cameron, Kerkam & Sutton. Attorneys May 7, 1935.  T. M. RECTOR  2,000,645
APPARATUS FOR PREPARING FOOD PRODUCTS
Filed Oct. 30, 1930  9 Sheets-Sheet 6

Inventor
Thomas M. Rector.
By
Cameron, Kerkam & Sutton.
Attorneys

May 7, 1935. T. M. RECTOR 2,000,645
APPARATUS FOR PREPARING FOOD PRODUCTS
Filed Oct. 30, 1930  9 Sheets-Sheet 7
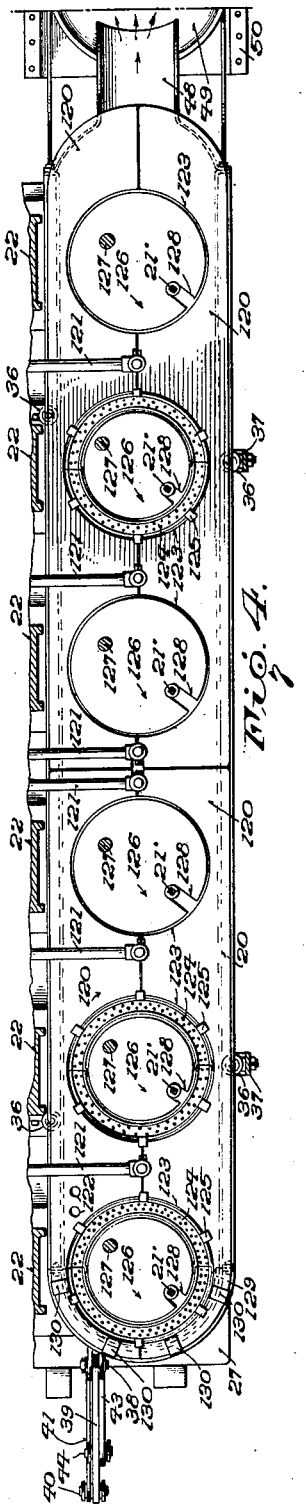
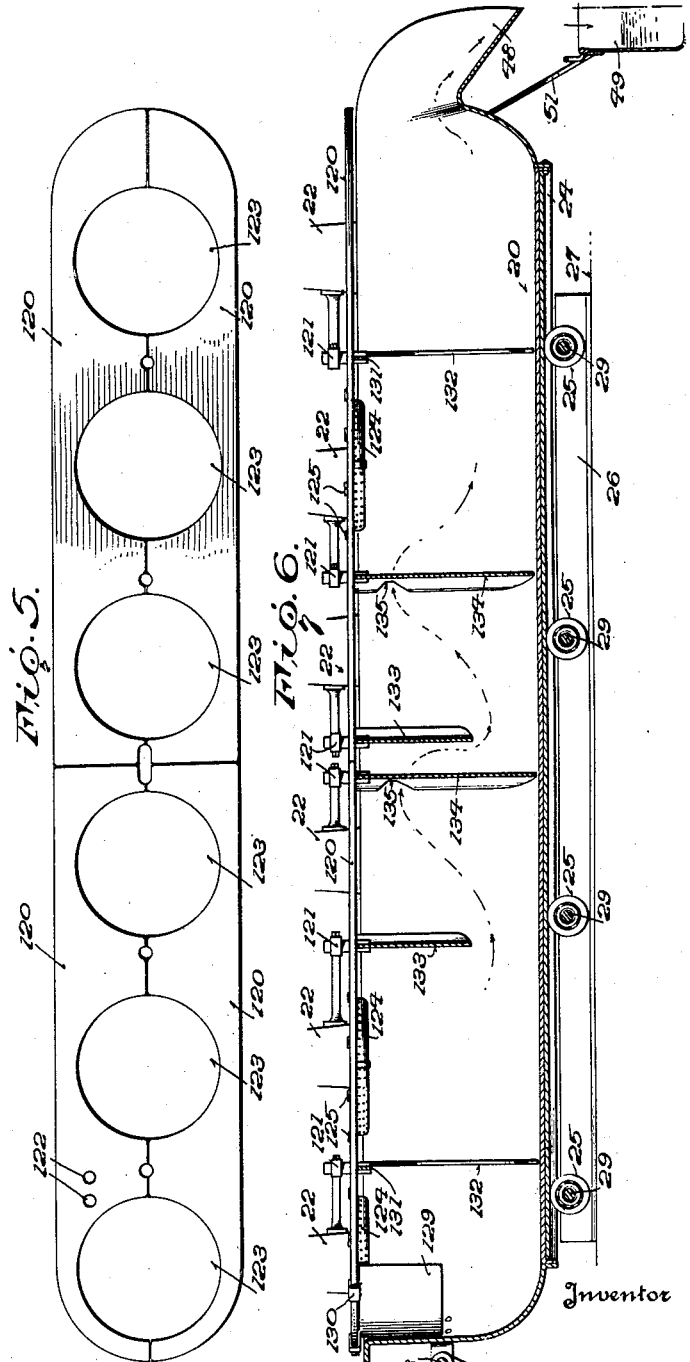
Inventor
Thomas M. Rector
By Cameron, Kerkam & Sutton
Attorneys

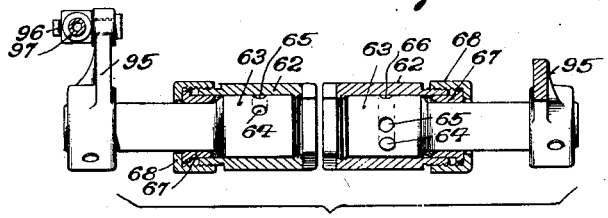

May 7, 1935. T. M. RECTOR 2,000,645
APPARATUS FOR PREPARING FOOD PRODUCTS
Filed Oct. 30, 1930   9 Sheets-Sheet 9
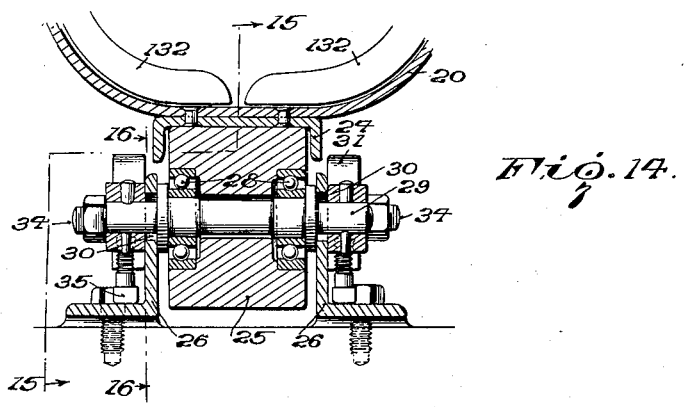
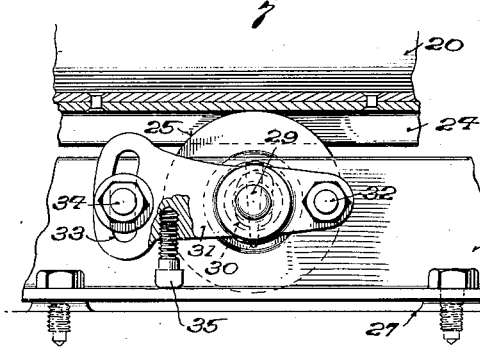
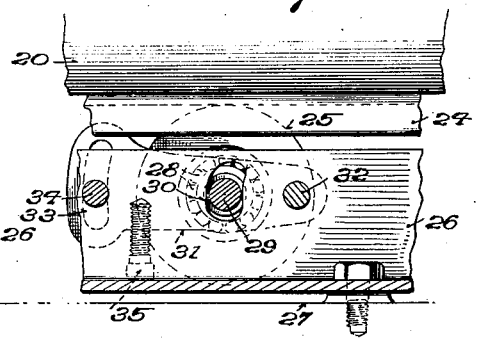
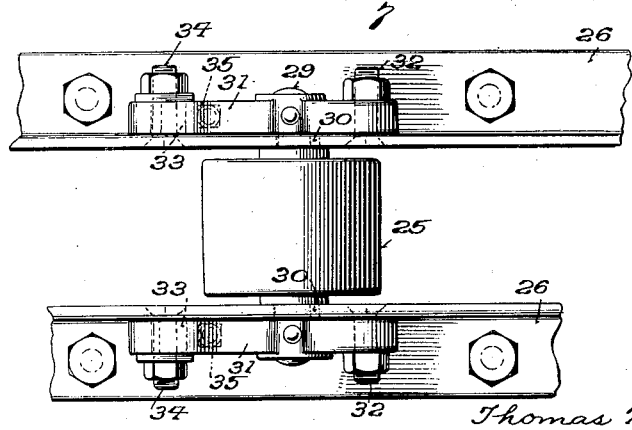
Inventor
Thomas M. Rector.
By
Cameron, Kerkam + Sutton.
Attorneys Patented May 7, 1935

2,000,645

UNITED STATES PATENT OFFICE 2,000,645

APPARATUS FOR PREPARING FOOD PRODUCTS

Thomas M. Rector, Rutherford, N. J., assignor, by mesne assignments, to The Best Foods, Inc., New York, N. Y., a corporation of Delaware Application October 30, 1930, Serial No. 492,295

22 Claims. (Cl. 259—93)

This invention relates to methods of and apparatus for mixing food materials and is more particularly adapted for the preparation of relatively thick stable emulsions such as the present commercially known salad dressing or mayonnaise, although not limited to such use.

In preparing relatively thick stable emulsions or mixtures of this character, the general practice is to start and to build up the emulsion by agitation, stirring, beating, or the like, while gradually adding ingredients to this emulsion, until the desired consistency is obtained. In actual practice the preparation of emulsions of this sort has heretofore been carried out practically exclusively by the batch method, that is, the emulsion has been started, built up, and completed in small batches or lots in suitable mixing bowls. In most cases, the amounts of the various ingredients, as well as the rate at which the ingredients are added, must be carefully regulated in starting and building up the emulsion, so that the careful attention of a skilled operator is required. In addition to the personal equation thus introduced in the process, the production output of the individual operator is limited and labor costs are relatively high.

One of the objects of the present invention is to provide a continuous method of emulsification wherein a continuous supply of starting materials is agitated or beaten and continuously emulsified and a steady uninterrupted supply of the finished emulsion is produced.

Another object is to provide a novel method wherein the materials to be mixed or emulsified are continuously fed to and progressed through a beating zone and a continuous supply of the finished product is delivered at the end of said zone.

Another object is to provide a novel method wherein materials to be mixed or emulsified are continuously fed to and progressed through a beating zone in which said starting materials are first emulsified, then beaten or whipped, and then diluted and further beaten or whipped to provide a continuous supply of finished emulsion.

A further object is to provide a novel method of producing a thick stable emulsion such as a salad dressing wherein the starting materials are continuously fed to and progressed through a zone of beating or agitation while additional materials are continuously added to build up the emulsion to the desired consistency.

A further object is to provide a novel emulsifying or mixing apparatus adapted to carry out the above method which is simple, economical, and reliable in construction and operation.

A still further object is to provide novel emulsifying or mixing apparatus embodying agitating or beating means defining a zone or region of beating together with means for continuously and automatically feeding the materials to be emulsified to said zone so as to provide a continuous supply of the finished emulsion or mixture.

Another object is to provide apparatus of the character described embodying a receptacle or container provided with agitating or beating means and defining a zone of beating or agitation through which the materials progress and wherein the starting materials are first emulsified, then beaten or whipped, and finally diluted and beaten or whipped to form a finished emulsion of the desired character and consistency.

Other objects include the provision of novel beating and agitating means whereby the entire mass of materials in the receptacle are thoroughly beaten, novel means for feeding the various ingredients at regulated and proportioned rates, and other novel means as described more fully hereinafter.

Another object is to provide apparatus of the character described embodying a receptacle or container provided with agitating or beating means and defining a zone or region of beating, said container and means having relative movement of a character adapted simultaneously to beat or agitate the ingredients fed thereto and to progress said ingredients through said zone, delivering the finished emulsion or mixture at the end thereof.

For purposes of illustration, the novel method will be hereinafter described as applied to the manufacture of a salad dressing in the form of a thick stable emulsion, but it is to be understood that neither the method nor the apparatus is limited to this particular use. Only so much of the present batch method of preparation of such a salad dressing will be set forth as is necessary to a ready understanding of the present invention. Salad dressing as now prepared and sold on the market comprises an emulsion usually containing as ingredients a suitable vegetable oil, such as cotton seed oil, egg yolk, vinegar, spices, sugar and salt, etc., mixed in carefully measured proportions. In starting the emulsion, the egg yolk, spices, sugar and salt, etc., together with a small amount of emulsion from a previous operation, are placed in a mixing bowl provided with a suitable stirring or beating device, and oil and vinegar are slowly added while the contents of the bowl are rapidly beaten. The amounts of the ingredients, particularly the oil and vinegar, are carefully measured and the rate at which these latter ingredients are added is regulated by the operator. The emulsion gradually builds up until a very thick stable emulsion is obtained, which may, if desired, be subsequently diluted with small quantities of vinegar or the like. The bowl is then emptied, cleaned, and a second batch started.

The method constituting the subject matter of the present invention is continuous and substantially automatic in operation as distinguished from the individually controlled batch method above described. In the new method, a zone or region of beating or agitation is established and provided with suitable stirring or beating means, and the ingredients to be emulsified are progressed through said zone while the emulsion is being formed. The starting ingredients are fed continuously to the zone at one end and additional ingredients are added to the starting ingredients as the latter progress through the zone of emulsification. It will be understood that this operation is continuous, a part of the starting ingredients being fed continuously to one end of the zone, and additional ingredients being continuously added as the starting ingredients travel through the zone, a continuous supply of the finished product being delivered at the other end of the zone. Moreover, since the desired proportions of the various ingredients are known and since the flow of all of the ingredients is continuous, suitable feed means are employed to provide a continuous feed for the ingredients at predetermined rates, whereby the operation is made substantially automatic.

In the manufacture of salad dressing, in order to reduce the number of separate feeds required, it is preferable to mix the ordinary starting ingredients such as egg yolk, spices, salt and sugar and preferably some water, in a suitable preliminary mixer, and these materials are continuously fed to the beating zone in any suitable manner at the proper predetermined rate, together with a continuous regulated supply of oil. In the beating zone, this mixture of starting materials is caused to travel slowly from the inlet or supply to the discharge end of the zone. During this travel, the starting materials are first beaten and emulsified in the initial portion of the beating zone, and thereafter for a suitable portion of the progress of the materials along the beating zone, they are thoroughly beaten or whipped. Toward the end of the beating zone, the emulsion may be diluted with vinegar or the like, if desired, and thereafter further beaten or whipped. The emulsion is thus built up along the beating zone and a thick stable emulsion of the desired consistency is delivered at the end of said zone. The dilution with vinegar may, however, be performed after the emulsion leaves the beating zone in a mixer of any suitable type.

The invention will be better understood by reference to the accompanying drawings showing one form of mixing or emulsifying apparatus that is particularly adapted to carry out the method described above, but it is to be expressly understood that said drawings are for purposes of illustration only and are not to be construed as a definition of the limits of the invention, reference being had to the appended claims for this purpose.

In said drawings—

Figs. 1, 1a and 1b constitute a side elevation, partly in section, of the beating or emulsifying apparatus;

Figs. 2 and 2a constitute a top plan view of the apparatus shown in Fig. 1, with parts removed for the sake of clearness;

Fig. 4 is a plan view of the receptacle or container with its cover in place;

Fig. 5 is a detail of the receptacle cover;

Fig. 6 is a diagrammatic side elevation of the receptacle;

Figs. 7 and 8 are details of pump cylinders for feeding ingredients to the receptacle;

Fig. 9 is a detail of means for controlling the path of the materials through the receptacle;

Fig. 10 is a detail of one end of the receptacle cover;

Fig. 11 is a perspective view of suitable pumping or feeding mechanism for the materials;

Figs. 12 and 13 are details of parts of the mechanisms of Fig. 11;

Figure 1:
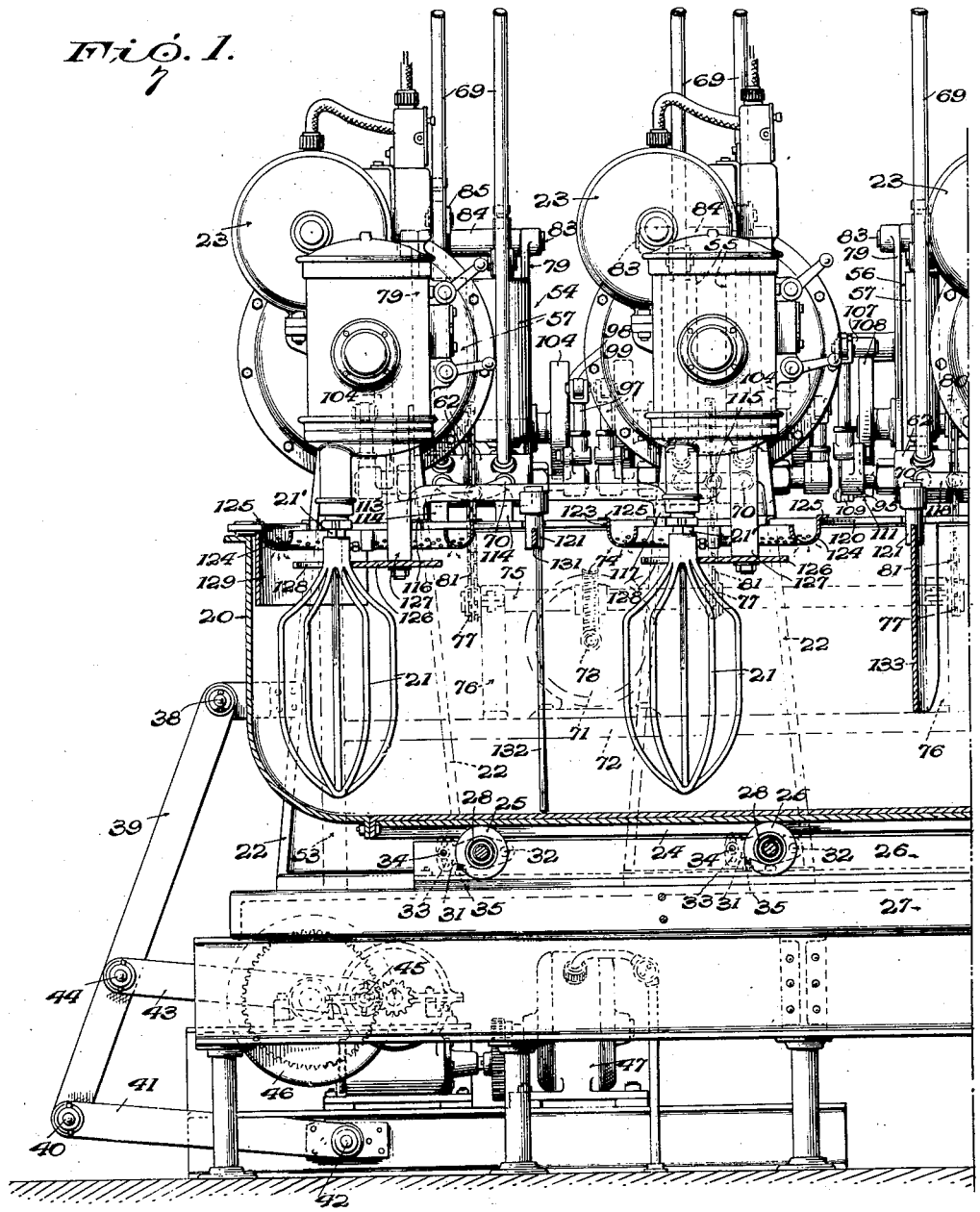

Figs. 14 to 17 inclusive, are detail views of means for movably mounting the receptacle or container, Figs. 15 and 16 being taken respectively on lines 15—15 and 16—16 of Fig. 14; and Fig. 18 is a detail view of further pumping or feeding mechanism.

In the preferred embodiment of the invention, as applied to the manufacture of salad dressing in the form of a thick stable emulsion, the beating or agitating zone is defined by a receptacle or container having the general form of a trough along which are positioned at spaced intervals a plurality of suitable beating elements. The starting ingredients are fed to one end of the trough in any suitable manner, as by a regulated gravity feed or a pump having a regulated rate of feed, and these materials may be caused to progress or travel along the trough to the discharge or delivery end thereof in any suitable manner but preferably by causing relative reciprocatory movement of the trough and the beating elements which movement works the materials along the trough. Ingredients to complete the finished product may be added at suitable points along the trough by any suitable means such as a regulated gravity feed or a pump having a regulated rate of feed.

Preferably the treatment of the materials as they progress along the trough comprises three stages. The starting materials, which as above stated may comprise egg yolk, spices, salt and sugar, and preferably some water, are fed to the inlet end of the trough and in the first portion of their travel therethrough are beaten and emulsified, this first portion constituting a zone of initial emulsification. Throughout a second intermediate portion of their travel along the trough, the emulsified materials from the first zone are thoroughly beaten or whipped, the course of travel being controlled in a suitable manner so that all of the materials are directly acted upon by the beaters and are thoroughly mixed and beaten. This second portion thus constitutes a beating or whipping zone. Throughout a third portion of their travel along the trough, the materials are preferably diluted with vinegar and further beaten, the materials leaving this third zone thus constituting a finished product. This third portion therefore constitutes a diluting and beating zone. It will be understood, however, that the apparatus may be adapted to carry out a different series of steps if desired.

Referring now to the apparatus shown in the drawings an elongated trough 20 of substantially U-shape cross section cooperates with a suitable beating unit comprising a plurality of beaters 21 to beat the ingredients. Said beaters, which as shown are six in number, may be of any suitable or known type and as shown are mounted on standards 22 at one side of the trough 20 and are driven by electric motors 23 which through suitable gearing cause the beater elements 21 to rotate on their own axes and at the same time to revolve with a planetary motion about an axis. Preferably the paths of movement of beaters 21 extend substantially completely across the trough 20.

Figure 3:
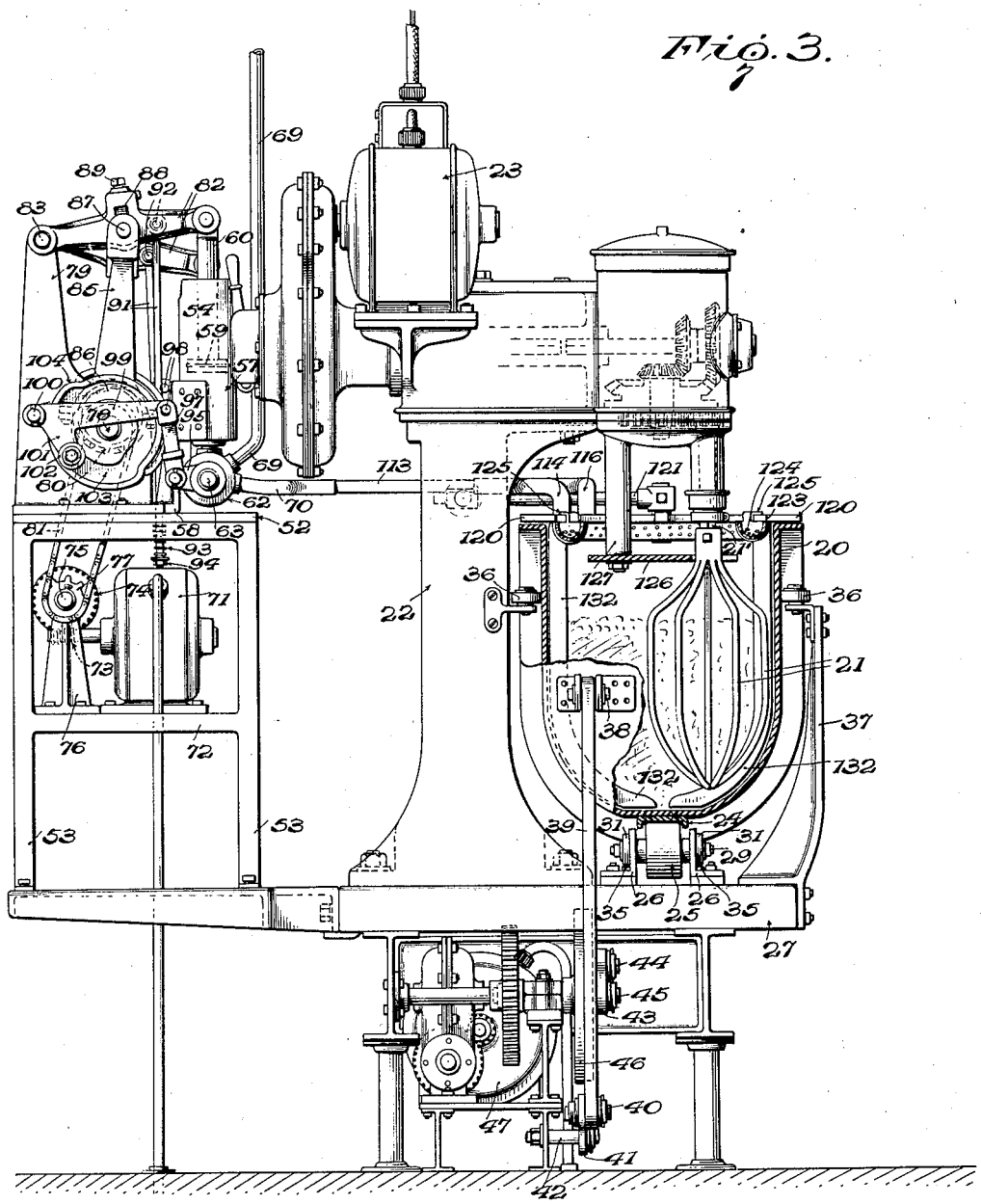
Fig. 3 is an end view of the emulsifying or beating apparatus.

Either the beating unit or the trough may be movable in order to provide for relative reciprocatory movement between the two, and in the form shown, the trough 20 is reciprocated relative to a stationary beating unit, this movement causing the travel of the materials along the trough. To this end the trough, as shown in Figs. 3 and 14, is provided on its bottom with a longitudinally extending inverted channel member 24 whereby the trough is mounted on one or more rollers 25 supported between angle irons or channels 26 or the like on a base 27. Rollers 25 may, if desired, be mounted for vertical adjustment and as shown are mounted by means of ball bearings 28 or the like on axles or spindles 29 which extend outwardly through elongated openings 30 in the angle irons 26. The outer ends of the axles 29 are suitably supported in arms 31, each of which is pivoted at one end at 32 to one of the channels 26 and is provided at its other end with an elongated slot 33 in which engages a bolt and nut 34 suitably secured to one of the channels 26. By loosening nuts 34, a pair of arms 31 may be swung about their pivots 32 to raise or lower one of the axles 29 and its roller 25, and preferably said arms are supported in adjusted position by suitable means such as set screws 35 threaded in said arms 31 and engaging the flanges of channels 26. The trough 20 is also preferably guided in its movement on rollers 25 by suitable means such as guide rollers 36, certain of which may be mounted on the standards 22 and others being carried by brackets 37 secured to the base 27.

The trough 20 may be reciprocated on rollers 25 in any suitable manner, and as shown in Fig. 1, one end of the trough has pivoted thereto at 38 an operating lever 39 that is in turn pivoted at 40 to an arm 41 having a stationary pivot 42. Lever 39 may be rocked to reciprocate the trough 20 by suitable means such as a link 43 pivoted at 44 to the lever 39 and at 45 to a wheel or disk 46 which may be rotated through any suitable gearing from an electric motor 47.

The beaters 21 preferably have a shape that conforms closely to the cross sectional form of the trough 20, as clearly shown in Fig. 3, and as said beaters follow their above described planetary movement and travel across the trough and close to its side while the trough reciprocates, substantially the entire area of the trough is covered by the beaters so that all of the materials therein are acted upon. Moreover, it is found that the reciprocation of the trough with respect to the beaters causes the materials in the trough to progress or travel slowly from the inlet end to the discharge end at which they are discharged by a suitable chute or spout 48 (Fig. 1b). As shown, materials discharged from spout 48 fall into a receptacle 49 on a car 50 which is connected to the moving trough by brackets 51, but it will be understood that any suitable disposition may be made of the discharged emulsion.

During their passage along the trough to the discharge spout, the materials pass successively through the three zones mentioned above. The first zone, or zone of emulsification, includes as shown the first two beaters; the second zone or zone of beating, includes the third and fourth beaters; and the third zone, or zone of dilution and final beating, includes the fifth and sixth beaters.

For the manufacture of salad dressing, as explained above, the starting materials including egg yolk, spices, and salt and sugar, diluted with some water to provide the proper flowable consistency, are preliminarily mixed in any suitable manner and fed to the inlet end of the trough. This feed may be either a gravity feed or a pump feed, and in the form shown in the drawings, a suitable pumping apparatus is employed which is capable of being regulated to feed the above mixture to the trough at a predetermined rate. Preferably this pumping apparatus comprises a plurality of pump cylinders having reciprocating plungers or pistons and adapted to discharge into the inlet end of the trough, one cylinder discharging into the trough while another cylinder has its suction stroke whereby a continuous feed is provided. Similar feed arrangements may be provided for supplying regulated quantities of oil to the inlet end of the trough, and of vinegar or the like to the third zone of dilution, the oil and vinegar pumps being preferably driven from the same source of power as the egg pumps and in timed relation therewith.

Referring particularly to Figs. 2, 3, 7, 8 and 11 to 13 inclusive, a suitable supporting table 52 is mounted at one side of the trough 20, preferably in back of the standards 22, by suitable legs 53 secured to the base 27. Disposed on the table 52 are a pair of egg pumps 54, a pair of oil pumps 55, and a pair of vinegar pumps 56, these pumps preferably being substantially similar in construction and operation and operated from a common source of power. As shown in Figs. 7 and 8, each pump comprises a vertical pump cylinder 57 supported on the table 52 by means of suitable brackets 58 and having therein a piston 59 and piston rod 60. At the bottom of each cylinder 57 is a single opening 61 which in one direction of movement of piston 59 serves as an inlet opening and in the other direction of movement of piston 59 serves as a discharge opening. To this end a valve casing 62 is secured to the bottom end of the cylinder 57 and houses a rotating valve plug 63 provided with a valve passage having three branches 64, 65 and 66, leakage from each valve casing being prevented in any suitable manner as by means of a gland 67 and nut 68 (Fig. 13). When the piston 59 is on its upstroke or suction stroke, as seen in Fig. 7, communication is established by way of passages 64 and 65 between an inlet pipe 69 and the port 61 so that the cylinder 57 fills up. When the piston 59 is on its downstroke or discharge stroke, as seen in Fig. 8, communication is established by means of passages 64 and 66 between a discharge pipe 70 and port 61 so that the contents of cylinder 57 are discharged.

Preferably all of the valve plugs 63 are rotated and all of the pistons 59 are reciprocated by a single source of power in suitably timed relation. Referring particularly to Figs. 3 and 11, this source of power may comprise an electric motor 71 mounted on a shelf 72 supported by the table legs 53. A worm 73 on the motor shaft meshes with a worm wheel 74 on a shaft 75 which is rotatably mounted in brackets 76 supported on the shelf 72. The shaft 75 constitutes a single operating shaft for all of the pumping means and as shown, is provided with a plurality of sprocket wheels 77 each of which is adapted to operate a pumping unit which as above described includes two cylinders. Only the egg pumping unit is shown in Fig. 11, and this unit is operated from a shaft 78 rotatably mounted in brackets 79 secured to the table 52 and provided with a sprocket wheel 80 which is driven from one of the sprocket wheels 77 by suitable means such as a chain 81. The pump pistons are operated from shaft 78 by suitable means which preferably may be adjusted to regulate the stroke of the pistons. As shown, the piston rods 60 are pivoted at their outer ends to operating levers 82 which operating levers are pivotally mounted at their other ends on a rod 83 supported in brackets 79, said levers being separated by suitable spacing means 84. The levers 82 intermediate their ends are connected to operating rods 85 which are driven by suitable eccentrics 86 mounted on the shaft 78, it being understood that eccentrics 86 are suitably arranged on said shaft so that the piston rods 60 move in opposite directions.

Preferably the connections between rods 85 and levers 82 are adjustable to regulate the pump strokes. As shown particularly in Fig. 12, each operating rod 85 is forked or bifurcated at its upper end and provided with a pin 87 which extends through a slot 88 in the associated operating lever 82. Suitable means such as a set screw 89 may be provided for adjusting the length of slot 88, and it will be seen that by adjusting set screws 89 the extent of movement which is imparted to the operating levers 82 by the eccentric rods 85 may be varied with consequent variation of the extent of the suction strokes of pistons 59. Preferably pins 87 and set screws 89 are maintained in contact by suitable resilient means, and as shown, a rod 91 is suitably connected at 92 to each of the operating levers 82, said rods extending downwardly through suitable openings in the table 52 and being provided beneath said table with suitable coil springs 93 interposed between said table and nuts 94 on the ends of rods 91. In this way, the operating levers 82 and their pistons are resiliently urged downwardly in opposition to the upward movement of eccentric rods 85.

The valve plugs 63 are likewise rotated from shaft 78, preferably by suitable cam mechanism, in properly timed relation with the movement of their respective pistons. As shown in Figs. 11 and 13, the ends of said valve plugs which extend outwardly of the valve casings 62 are each provided with a rock arm 95 which is pivotally connected at 96 with an operating link 97 which link is in turn pivotally connected at 98 with one arm 99 of a two-armed lever pivoted at 100 on a bracket 79. The other arm 101 of said two-armed lever is provided at its end with a suitable roller 102 which engages in a cam groove 103 of a cam member 104 secured to the shaft 78. As the shaft 78 rotates, each of the two-armed levers is rocked about its pivot 100 and this rocking movement is transmitted through the links 97 and rock arms 95 to the valve plugs 63 to rock the latter between the positions shown in Figs. 7 and 8 in properly timed relation with the movement of the pistons 59.

It will be understood that the oil pumps 55 and the vinegar pumps 56 may be the same as the egg pumping unit above described and driven from the common operating shaft 75 in the same way. Fig. 18, however, shows a somewhat modified cam mechanism for operating the links 97 from shaft 78 which mechanism may be employed in place of that described above and is shown in Fig. 2 applied to the vinegar pumps 56. Referring to Fig. 18, the links 97 may be actuated by means of levers 105 each of which is pivoted at 106 on one of the brackets 79 and is provided intermediate its ends with a roller 107 engaging a suitable cam 108. Preferably a second lever 109, pivoted to bracket 79 at 110, is provided with a roller 111 which engages cam 108 at a point diametrically opposite the roller 107, said levers 109 being connected to levers 105 by suitable links 112.

As clearly shown in Fig. 2, the mixture of starting materials discharged from the discharge pipes 70 of pumps 54 is conducted through a feed pipe 113 to the trough 20 adjacent its inlet end, said pipe 113 being if desired branched at 114 to provide two points of discharge into the trough. Similarly the oil discharged from discharge pipes 70 of pumps 55 is conducted by a feed pipe 115 to the inlet end of the trough 20, said pipe 115 being preferably branched and the two branches 116 and 117 delivering the oil respectively adjacent the first and second beaters. The vinegar discharged from the discharge pipes 70 of pumps 56 is similarly conducted by a feed pipe 118 to a point adjacent the fifth beater, said pipe being branched at 119 to provide two points of discharge.

For sanitary purposes and to prevent splashing from the trough 20, a suitable cover is preferably provided for the trough. As shown in Figs. 2 and 2a, and in detail in Fig. 5, said cover may comprise a plurality of sections 120 of suitable material such as sheet metal which are supported above the trough in any suitable manner and are provided with suitable openings where necessary for the passage of the beater shafts, feed pipes, etc. Preferably said cover sections are supported by a plurality of arms 121 which as shown are secured to the standards 22 and extend over the trough and downwardly through suitable openings in the cover sections, said arms 121 being provided with suitable members (see Figs. 9 and 10) which support the cover sections and also serve as hereinafter described to scrape the sides of the trough and to guide and control the course of travel of the materials along the trough. The cover sections 120 are suitably shaped so that they may be placed in position or removed from position without interfering with the beaters, scrapers and guides, and other elements.

The branches 114 of the egg delivery pipe 113 extend downwardly through one of the cover sections 120 through suitable openings 122, as seen in Figs. 4 and 5. The branches 116 and 117 of the oil delivery pipe 115 may extend through the cover in similar fashion but preferably discharge into distributing means which distribute the oil around each of the first two beaters 21. In the form shown the beaters 21 extend through the large openings 123 of the cover sections which are of sufficient extent to permit the planetary movement of the beaters, and the oil distributing means comprise annular troughs 124 which may be made in sections and supported from the cover 120 by suitable tabs 125, these troughs extending around the peripheries of openings 123 and surrounding the paths of revolution of the beater shafts 21' so that the oil is distributed over relatively large areas and is always mixed with the materials in the trough directly in the path of the revolving and rotating beaters 21.

Means are preferably provided for covering the openings left in the cover 120 through which the beater shafts extend. To this end circular plates 126 may be employed, which plates are carried on downwardly projecting posts 127 (Figs. 1 and 2) and are freely rotatable thereon, said plates 126 being provided with slots 128 through which the shafts 21' of beaters 21 extend. Where the annular troughs 124 are employed, the diameter of plates 126 is substantially equal to the inner diameter of troughs 124, and where said annular troughs 124 are not employed the diameter of plates 126 may be substantially equal to the diameter of openings 123 in the cover 120. The posts 127 and the beater shafts 21' revolve together about a common axis which is coaxial with plates 126, so that said plates are caused to rotate on their own axes, and at the same time beater shafts 21' rotate freely in the openings 128 on their own axes. Suitable means may also be provided for preventing splashing from the end of the trough when it is moved to the left from the position shown in the drawings, and to this end a splash guard 129 extends downwardly from the cover 120, said splash guard being secured to said cover in any suitable manner as by clamps 130 and being curved to conform with the curved end of the trough 20.

Suitable means are provided for scraping the sides of trough 20 as it reciprocates in order to make sure that all of the materials are thoroughly mixed and beaten, and preferably the course of travel of the materials is controlled or guided by suitable means in the second zone to provide better circulation and mixing of the materials. The scrapers, as shown between the first and second beaters and between the fifth and sixth beaters (Fig. 6), are preferably of the form shown in detail in Fig. 10 wherein a cross bar 131 is secured to the supporting arm 121 and as explained above constitutes a cover support. Secured to the cross bar 131 are downwardly extending scraping arms 132 that are curved to conform with the cross sectional shape of the trough 20. Scrapers 132 are stationary, and as the trough 20 reciprocates, these scrapers continuously wipe the sides and bottom of the trough clean of all adhering material.

In the intermediate beating or whipping zone, the scrapers are preferably of the form shown in Figs. 6 and 9 and not only scrape the sides of the trough but provide for an up and down movement of the materials as they travel along the trough. As shown in Fig. 9, the supports 121 between the second and third beaters and between the third and fourth beaters carry downwardly extending somewhat curved plates 133 which serve both as scrapers for the sides of the trough and as supports for the cover 120 but which as clearly shown in Fig. 6 do not extend to the bottom of the trough. Between the third and fourth beaters, and the fourth and fifth beaters, the supports 121 carry plates 134 which extend downwardly to the bottom of the trough and which not only support the cover 120 but also scrape both the sides and the bottom of the trough. Adjacent their upper portions, however, said plates 134 are provided with openings 135 providing a passage for the materials. Each pair of plates 133 and 134 encloses one of the beaters 21, as seen in Figs. 1 and 1a. As the trough 20 reciprocates and moves to the left as viewed in Fig. 6, the materials in the intermediate beating or whipping zone cannot be carried freely to the left with the trough because of plates 133 and 134 which are stationary. The beaters 21 between said plates, however, build up a slight pressure of the materials sufficient to force them through the openings 135, after which they cannot pass to the left of plates 134. The result of this operation is that in the intermediate zone, the materials cannot move freely with the trough but a slow movement of the materials is established under the first plate 133, upwardly and through the openings 135 in the first plate 134, downwardly under the second plate 133, upwardly through the openings 135 in the second plate 134, and into the third zone of dilution and beating. The up and down travel of the materials, together with the planetary movement of the beaters, results in very thorough mixing and beating of the materials in the intermediate zone of the trough.

The operation of the apparatus will be understood from the above description and may be summarized briefly as follows. Assuming the pumping units to be in operation, a continuous supply of the egg starting mixture is fed to the inlet end or initial emulsifying zone of the trough. At the same time, oil is likewise fed to the trough at a regulated rate, being distributed by means of the annular troughs 124 around the beaters and substantially over the initial zone of the trough. At the same time the trough is reciprocated by the mechanism described, this movement being relatively quite slow. In the first zone, therefore, the starting mixture and the oil are thoroughly mixed and beaten, the entire area of the first zone being covered by the beaters and the sides of the trough being scraped by scrapers 132, so that the materials are initially emulsified. The movement of the trough relative to the beaters and scrapers tends to cause the materials to progress slowly from left to right as viewed in Fig. 6, and during this slow movement the emulsion is gradually built up by the addition of more oil adjacent the second beater.

The initially emulsified materials gradually move on and through the second zone, this movement being caused by the relative reciprocation of the trough relative to the beaters and plates 133 and 134. In this zone the materials not only move longitudinally of the trough past the beaters but also move up and down in the trough due to the plates 133 and 134, and are mixed from side to side of the trough by the planetary movement of the beaters. Accordingly in the second or intermediate zone all of the materials are thoroughly mixed and beaten or whipped to provide a thick stable emulsion.

The materials passing through the openings in the second plate 134 are prevented by said plate from returning toward the inlet end of the trough and due to the movement of the trough relative to the fifth and sixth beaters are caused to move slowly through the third zone and finally to discharge from the spout 48. In this third zone, the emulsion is diluted to the desired consistency by vinegar which is thoroughly mixed in and beaten up with the emulsion around the fifth beater, and is further beaten or whipped around the sixth beater.

It will be seen that the method as described above is continuous and substantially automatic in that all of the materials are fed continuously and at predetermined regulated rates to the apparatus and the finished emulsion is continuously delivered therefrom. This method avoids substantially all of the disadvantages incident to the preparation of salad dressing or the like by the batch method, such as loss of time, reduced production, high labor costs, etc., and produces economically and in larger quantities a product that is strictly uniform in character and of high quality. Moreover, the apparatus required is relatively simple, rugged and durable and requires very little care and attention. The entire apparatus is substantially self-operating and the personal equation practically eliminated since the various feeds may be regulated and fixed with scientific accuracy and once predetermined and fixed require little or no attention. Slight supervision by a single attendant is all that is required, and highly trained and skilled operators are unnecessary. As compared with methods and apparatus heretofore employed, the invention effects important manufacturing economies because production is increased and labor costs greatly reduced, and equipment costs per unit production are also decreased.

It is to be expressly understood that the method is not limited to the manufacture of salad dressing, nor to the emulsification of food products, and moreover, the particular apparatus described is not necessary to the practice of the method but any suitable apparatus may be employed. The form of apparatus that has been described for purposes of illustration only is capable of various embodiments without departing from the spirit of the invention. Thus the beating unit may be movable and the trough stationary, the motion of the beaters may be changed to suit conditions, the container and other elements of the apparatus may be replaced by equivalent elements, and the form and details of construction of the parts may vary widely. Reference is therefore to be had to the appended claims for a definition of the limits of the invention.

What is claimed is:

1. Emulsifying apparatus for the continuous manufacture of mayonnaise comprising in combination a container, a beating unit comprising a plurality of beating elements operating in said container, means for feeding starting materials into said container, means for discharging said materials continuously therefrom, means for reciprocating said container relative to said beating unit, said relative movement being effective to feed said materials from said supplying means to said discharging means, and means for adding additional materials to said container at spaced points between said feeding and discharging means.

2. Apparatus of the class described comprising in combination a container, a beating unit comprising a plurality of beating elements each rotating on its own axis and having an individual path of movement in said container, means for feeding materials to and discharging materials from said container, said container and beating unit having relative reciprocation to feed said materials from said feeding to said discharging means, and means for adding additional materials to said container between said feeding and discharging means.

3. Emulsifying apparatus for the continuous manufacture of mayonnaise comprising a container, a beating unit comprising beating elements operating in said container, means for effecting relative reciprocatory movement between said container and beating unit, the plane in which said movement takes place being substantially perpendicular to the axes of said beating elements, means for feeding material to and continuously discharging material from said container, and means for continuously supplying additional materials to said container between said feeding and discharging means.

4. Apparatus of the class described comprising a container, a beating unit including a plurality of rotatable beating elements spaced in and extending downwardly into said container with their axes of rotation substantially vertical, said container and beating unit having relative movement to cause materials in said container to travel therethrough in a path including said beating elements, means for continuously supplying materials to said container, means for discharging materials therefrom, means associated with one or more of said beating elements for continuously adding materials to said container at a predetermined rate, and means for distributing said added materials over the path of revolution of the associated beating element or elements.

5. Apparatus of the class described comprising a container, a beating unit comprising a plurality of beating elements each having a planetary movement of rotation about its own axis and revolution about an axis, said container and beating unit being mounted for relative reciprocation, and means for scraping the sides of said container, said scraping means being mounted intermediate and outside of the paths of planetary movement of two of said beating elements.

6. Apparatus of the class described comprising a trough-shaped container, a plurality of rotating beaters spaced along said container, means for causing relative reciprocation of said container and beaters, means for supplying materials to and discharging materials from the ends of said container, and means for adding materials to said container at points intermediate its ends.

7. Apparatus of the class described comprising a trough-shaped container, a plurality of rotating beaters spaced along said container, means for scraping the walls of said container, means for reciprocating said container relative to said beaters and scraping means, means for feeding materials to one end of said container, means for discharging material from the other end thereof, and means for feeding material to said container intermediate its ends.

8. Apparatus of the class described comprising a trough-shaped container, a plurality of beaters in said container each rotating on its own axis and revolving about a fixed axis, a plurality of means for scraping the wall of said container, means for reciprocating said container relative to said beaters and scraping means, means for continuously feeding material to one end of said container, means for discharging material from the other end thereof, and individually controllable means associated with each of a plurality of said beaters for continuously feeding additional materials to said container.

9. Apparatus of the class described comprising a container, a beating unit comprising a plurality of beating elements operating in said container, means for feeding materials to said container, means for discharging materials from said container, means for reciprocating said beating unit and container relatively to one another and causing said materials to travel from said feeding means to said discharging means, and means for preventing reverse travel of said materials in said path.

10. Apparatus of the class described comprising a container, a beating unit comprising a plurality of beating elements operating in said container, means for feeding materials to said container, means for discharging materials from said container, means for reciprocating said beating unit and container relatively to one another and causing said materials to travel from said feeding means to said discharging means, and means effective in an intermediate portion of the travel of said materials for guiding the same in a tortuous path.

11. Apparatus of the class described comprising a container, a beating unit comprising a plurality of beating elements operating in said container, means for feeding materials to said container, means for discharging materials from said container, means for reciprocating said beating unit and container relatively to one another and causing said materials to travel through said container from said feeding means to said discharging means, and means in an intermediate portion of the path of travel of said materials for guiding the same in a tortuous path and for preventing reverse movement in said path.

12. Apparatus of the class described comprising a movable container, means for feeding materials to said container and for discharging materials from said container, a plurality of beating elements operating in said container, stationary means for scraping the sides of said container, and a cover for said container supported by said scraping means and provided with openings through which said beating elements extend.

13. Apparatus of the class described comprising a horizontally reciprocable container, means for feeding materials to said container and for discharging materials from said container, a plurality of rotatable beating elements extending downwardly into and operating in said container, means for feeding an additional ingredient to said container, and means for distributing said additional ingredient over a substantial and definite area of said container.

14. Apparatus of the class described comprising a container, means for feeding materials to said container and for discharging said materials from said container, a plurality of beating elements operating in said container and each having a movement of revolution about an axis, means for feeding an additional ingredient to said container, and an annular distributing member for said additional ingredient having a diameter approximately that of the path of revolution of one of said beating elements.

15. Apparatus of the class described comprising a container, means for feeding materials to said container and for discharging materials from said container, a plurality of beating elements operating in said container, a cover for said container having openings through which said beating elements extend, means for feeding an additional ingredient to said container, and an annular distributing trough for said additional ingredient supported by said cover and surrounding one of said beating elements.

16. Apparatus of the class described comprising a container, means for feeding materials to said container and for discharging materials from said container, means for reciprocating said container, a plurality of beating elements operating in said container, and a plurality of stationary elements in the path of travel of said materials for guiding the same and arranged to cause said materials to travel up and down in said container.

17. Apparatus of the class described comprising a container, means for feeding materials to said container and for discharging materials from said container, a plurality of beating elements operating in said container, means for effecting relative reciprocation between said container and said beating elements, and a plurality of elements fixed relatively to said beating elements and disposed in the path of travel of said materials for guiding the same, one of said guiding elements being spaced from the bottom of said container and an adjacent guiding element extending to the bottom of the container but having an opening adjacent its upper portion.

18. Apparatus of the class described comprising a reciprocable container, a plurality of pumps for feeding materials to said container at spaced points, means disposed in said container and effective upon reciprocation of the latter for causing said materials to travel through said container, a plurality of beating elements operating in said container with their axes substantially perpendicular to the path of travel of said materials, and means for discharging materials from said container.

19. Emulsifying apparatus for making mayonnaise comprising a container, rotatable beating elements operating in said container, means for reciprocating said container relative to said beating elements in a plane substantially perpendicular to the axes of rotation of said elements, means for feeding starting materials to one end of said container, means for feeding an emulsifying oil to and distributing said oil over a portion of said container, and means for feeding a diluent to said container adjacent its other end.

20. Emulsifying apparatus for the continuous manufacture of mayonnaise comprising a container, a beating unit operating in said container, means for effecting relative reciprocatory movement between said container and said beating unit, means for continuously feeding starting materials to said container, means disposed within said container which in conjunction with said reciprocatory movement effect progression of said materials through said container, a plurality of individually controlled means for continuously adding additional materials to said starting materials as the latter progress through said container, and means for continuously discharging mayonnaise from said container.

21. Emulsifying apparatus for the continuous manufacture of mayonnaise comprising the combination of a container, rotatable beating means operating in said container, said beating means and container being relatively movable to progress materials along said container, the plane of said movement being substantially perpendicular to the axis of rotation of said beating means, means for continuously feeding mayonnaise forming materials to said container, means for regulating the rate of feed of said feeding means, and means for continuously discharging mayonnaise from said container.

22. Emulsifying apparatus for the continuous manufacture of mayonnaise comprising the combination of a container, a beating unit operating in said container and comprising a plurality of spaced beating elements each adapted to be continuously rotated in one direction about a substantially vertical axis, said beating unit and container being relatively movable in a horizontal plane to progress materials along said container, means for continuously feeding starting materials to said container adjacent one of said beating elements, means for feeding an additional ingredient to said container adjacent another beating element, and means for continuously discharging mayonnaise from said container.

THOMAS M. RECTOR.